United States Patent
Davidson

(10) Patent No.: US 8,224,815 B2
(45) Date of Patent: Jul. 17, 2012

(54) INTERACTIVE MESSAGE EDITING SYSTEM AND METHOD

(75) Inventor: Perry Davidson, Tel-Aviv (IL)

(73) Assignee: Perion Network Ltd., Tel Aviv (IL)

( * ) Notice: Subject to any disclaimer, the term of this patent is extended or adjusted under 35 U.S.C. 154(b) by 320 days.

(21) Appl. No.: 12/601,025

(22) PCT Filed: May 21, 2007

(86) PCT No.: PCT/IL2007/000620
§ 371 (c)(1),
(2), (4) Date: Jan. 6, 2010

(87) PCT Pub. No.: WO2008/142669
PCT Pub. Date: Nov. 27, 2008

(65) Prior Publication Data
US 2010/0153376 A1   Jun. 17, 2010

(51) Int. Cl.
*G06F 7/00* (2006.01)
*G06F 17/30* (2006.01)

(52) U.S. Cl. ...................................... 707/723
(58) Field of Classification Search .................. 707/723
See application file for complete search history.

(56) References Cited

U.S. PATENT DOCUMENTS

| | | |
|---|---|---|
| 5,564,004 A | 10/1996 | Grossman et al. |
| 5,848,424 A | 12/1998 | Scheinkman et al. |
| 5,873,107 A * | 2/1999 | Borovoy et al. ............. 715/234 |
| 5,995,093 A | 11/1999 | Lambourne et al. |
| 6,041,335 A | 3/2000 | Merritt et al. |
| 6,154,757 A | 11/2000 | Krause et al. |

(Continued)

FOREIGN PATENT DOCUMENTS

EP  1595586 A2  11/2005

OTHER PUBLICATIONS

Liu et al., Automatic Affective Feedback in an Email Browser, MIT Media Laboratory Software Agents Group Technical Report, available at http://agents.media.mit.edu/projects/emotusponens/empathybuddy.pdf, XP 002450428, Nov. 2002.

(Continued)

*Primary Examiner* — Robert Beausoliel, Jr.
*Assistant Examiner* — Nicholas Allen
(74) *Attorney, Agent, or Firm* — Abraham Hershkovitz; Harold L. Novick; Hershkovitz & Associates, LLC

(57) ABSTRACT

In an interactive message editing system (10) and method a database (16) contains data representative of a plurality of media objects (19a, 19b, 19c, 19d) and of a plurality of data strings each associated with one or more of the media objects according to a predetermined rank. A memory (14) stores multimedia message data entered by a user and a parser (15) coupled to the memory parses the message data on the fly for identifying successive character strings, each of which is compared with data strings in the database. One or more media objects associated with a data string in the database that at least partially matches a character string are presented on a display device (11) according to the predetermined rank for manual selection by the user. A selected media object is embedded in spatial association with the associated data string.

12 Claims, 10 Drawing Sheets

U.S. PATENT DOCUMENTS

| | | |
|---|---|---|
| 7,159,192 B2 | 1/2007 | Dobronsky |
| 2001/0029527 A1 | 10/2001 | Goshen |
| 2002/0055955 A1 | 5/2002 | Lloyd-Jones et al. |
| 2002/0091713 A1 | 7/2002 | Walker |
| 2002/0137507 A1* | 9/2002 | Winkler ................. 455/426 |
| 2002/0149623 A1 | 10/2002 | West et al. |
| 2003/0079181 A1 | 4/2003 | Schumacher et al. |
| 2004/0004811 A1 | 1/2004 | Shimada et al. |
| 2004/0205133 A1 | 10/2004 | Adler |
| 2004/0268259 A1 | 12/2004 | Rockey et al. |
| 2005/0154997 A1 | 7/2005 | Brun-Cottan et al. |
| 2005/0163379 A1 | 7/2005 | Zimmerman |
| 2006/0004914 A1* | 1/2006 | Kelly et al. ............ 709/219 |
| 2006/0079293 A1* | 4/2006 | Nelson .................. 455/566 |
| 2006/0101328 A1 | 5/2006 | Albornoz et al. |
| 2007/0112839 A1* | 5/2007 | Bjarnestam et al. ...... 707/102 |
| 2007/0271340 A1* | 11/2007 | Goodman et al. ........ 709/206 |
| 2008/0220797 A1* | 9/2008 | Meiby et al. ............ 455/466 |
| 2008/0244446 A1* | 10/2008 | LeFevre et al. ......... 715/810 |
| 2008/0268882 A1* | 10/2008 | Moloney ................ 455/466 |
| 2009/0019117 A1* | 1/2009 | Bonforte et al. ......... 709/206 |

OTHER PUBLICATIONS

Database Search Result, XP002450647, Aug. 25, 2006, European Patent Office, The Hague, NL.

* cited by examiner

| ID | Type | MEDIA | STRINGS | | | | |
|---|---|---|---|---|---|---|---|
| | | | 1 | 2 | 3 | 4 | 5 |
| 0001 | A |  | Smile | Happy | Great | Fun | Joy |
| 0002 | B |  | Cute | Cuddly | Sweet | Bear | Happy |
| 0003 | C |  | Funny | Hilarious | LOL | Laughing | LMAO |
| 0004 | D |  | Woman | Painting | Art | Beauty | 'Mona Lisa' |
| 0005 | B |  | Bore | Tiring | Sleepy | Sluggish | Irksome |
| 0006 | A | ₁ | | String | String | String | String |

INTERACTIVE MESSAGE EDITING SYSTEM AND METHOD

FIELD OF THE INVENTION

This invention relates computerized message messaging systems.

BACKGROUND OF THE INVENTION

In the rapidly advancing communications field people benefit from communicating information swiftly and efficiently. Beyond the transmission of vocal and textual information, media content is often intertwined in the information stream. The procedures of retrieving and coupling media content with textual or vocal information streams are cumbersome and time consuming. This leads to deficient use of media content which would otherwise greatly enhance the information stream.

U.S. Pat. No. 5,848,424 discloses a hypertext browser that displays hypertext pages and indicates draggable elements on the page being viewed. The browser also displays drop targets and detects when a user selects a draggable element and drops the draggable element within a drop target. The browser display includes a toolbar containing one or more drop target atoms which are represented by object icons and which may change depending on what server the browser is currently connected to.

US2004268259 (Microsoft Corp.) discloses methods and systems for presenting commands to a user within a software application program by determining the user's context within the application program and automatically presenting in a user interface commands that pertain to the user's current context.

Text and character editing systems are also known that provide an autocorrect facility, whereby a string entered by the user is automatically changed on the fly to a different string or to a graphical symbol. This technique is used in word-processing software to correct typos and to provide a user-friendly interface for entering symbols such as © by typing a predetermined sequence of characters, such as (c). A similar technique is used to insert glyphs such as ☺by typing :). Mobile telephones and other hand-held devices offering a similar facility are also known.

The autocorrect feature as described above maps each source character sequence to a unique target string or symbol. Of course, the same target string or symbol can be mapped to more than one source string: so, for example, both 'accommodate' 'acommodate' may be automatically corrected to 'accommodate'. When there is a clear and unique mapping between source and target strings, as in this example, the forced conversion from an incorrect string to a correct string is efficient. However, it is by no means always desirable to force such conversion. For example, the third paragraph of a sequence may be manually identified as (c) and it is frustrating if this is automatically changed to the copyright symbol. For this reason, an 'undo' facility is often provided that allows an autocorrected target string or symbol to be changed back to the source sequence.

Likewise, a source string may be ambiguous. For example, a typist who typed 'accommodatin' may have intended 'accommodating' or 'accommodation'. Spell check features frequently provides a list of feasible alternatives for manual selection by the typist; but autocorrect features cannot offer such facility because it would render them manual and thereby militate against the automatic nature of the correction.

Since the target string or symbol replaces the source sequence, the autocorrect feature does not preserve both source and target sequences in the final document or message. Therefore, the autocorrect feature does not provide a mechanism for enhancing documents by embedding multimedia content such as glyphs alongside a character sequence with which the respective glyph is associated. But in the interest of making a multimedia message more interesting and 'spicy' it may be desired to embed glyphs or other multimedia elements in the message in a manner that permits a logical or cognitive relationship with the multimedia element and a character sequence with which it is associated and yet that preserves both the source character sequence and also the target multimedia element, preferably in spatial coordination so that the multimedia elements on their own provide a fair indication of the message content.

Moreover, as noted, there is no provision in the autocorrect feature to map a single source character sequence to multiple target strings or symbols. Consequently, the autocorrect feature does not even partially address the need to allow alternative multimedia elements to be associated with a given source sequence.

SUMMARY OF THE INVENTION

According to one aspect of the present invention there is provided an interactive message editing system, comprising:

a database containing data representative of a plurality of media objects and of a plurality of data strings each associated with one or more of said media objects, a memory for storing multimedia message data entered by a user via a user interface, a parser coupled to the memory for parsing said message data on the fly for identifying successive character strings, a comparator coupled to the parser and to said database for comparing each of the character strings with data strings in the database, an interactive menu compiler coupled to the comparator and responsive to a character string at least partially matching a data string in the database for presenting on a display device one or more media objects associated with the data string, and a media enhancer responsive to manual selection by the user of a presented media object for embedding the selected media object in spatial association with the associated character string.

According to another aspect of the invention, there is provided an interactive message editing method comprising:

maintaining a database containing data representative of a plurality of media objects and of a plurality of data strings each associated with one or more of said media objects;

storing multimedia message data entered by a user via a user interface;

parsing said message data on the fly for identifying successive character strings;

comparing each of the character strings with data strings in the database;

presenting on a display device one or more media objects associated with a data string in the database that at least partially matches a character string, and embedding a selected media object in spatial association with the associated character string.

According to yet another aspect of the invention, there is provided a computer readable medium bearing a database structure containing data representative of a plurality of media objects and of a plurality of data strings each associated with one or more of said media objects according to a predetermined rank.

The present invention allows enhancement of everyday communication with media content, without loss of speed or efficiency in the communication process and in a manner that does not require user interaction but nevertheless affords the user with a degree of choice and control.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
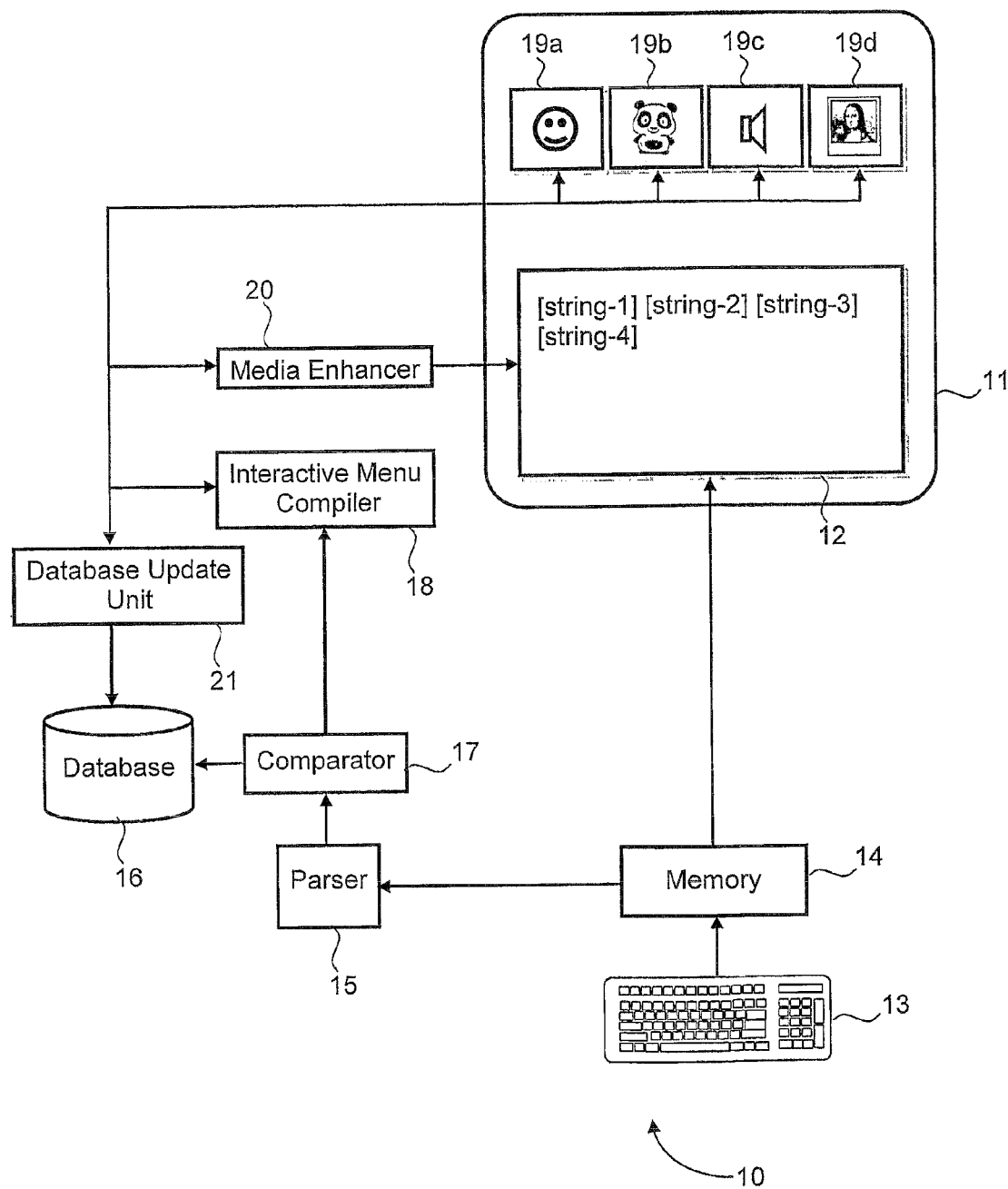
FIG. 1 is a schematic representation of an interactive message editing system according to an embodiment of the invention.

FIG. 1 is a schematic representation of an interactive message editing system 10 according to an embodiment of the invention. The system 10 comprises a display device 11 having a window 12 for entry of an instant on-line message via a keyboard 13 (constituting a user interface). The user interface also typically includes a selection device such as a pointer or mouse (not shown) that allows a user to select a multimedia object displayed on the display device 11.

The keyboard 13 is coupled to a memory 14 that buffers message data as it entered by the user and to which the display device 11 is connected for displaying message data in real time. A parser 15 is coupled to the memory 14 for parsing the message data on the fly for identifying successive character strings of which four are shown in the figure as string-1, string-2, string-3 and string-4.

A database 16 contains data representative of a plurality of media objects and of a plurality of data strings each associated with one or more of the media objects. In accordance with some embodiments of the invention, the media objects are mapped to the data strings according to a predetermined rank depicting a nominal preference to be accorded to each media object matching the respective data string, as explained in greater detail below with reference to FIG. 3 of the drawings. A comparator 17 is coupled to the parser 15 and to the database 16 for comparing each of the character strings with data strings in the database. An interactive menu compiler 18 coupled to the comparator 17 is responsive to a character string at least partially matching a data string in the database 16 for presenting on the display device 11 one or more media objects 19a to 19d associated with the data string according to the predetermined rank. A media enhancer 20 is responsive to manual selection by the user of a presented media object for embedding the selected media object in spatial association with the associated data string. An optional database update unit 21 is coupled to the database 16 and is responsive to successive manual selections of displayed media objects for adjusting the respective ranks of media objects matching the current character string and updating the database accordingly. Similarly, as will be explained in greater detail below, the database update unit 21 may be responsive to repeated manual selection of objects of a specified type, for increasing the rank of all media objects of the specified type in the database 16.

The interactive message editing system 10 employs communication software within an application program that may be an e-mail, SMS (Short Message System), Instant Messaging system, or any other similar application program and may be part of a computer or a hand-held portable communications device such as mobile telephone, PDA and the like. Although such application programs clearly require of a suitable user interface and display, it is to be understood that the editing system according to the invention may be a standalone system to which the user interface and display are coupled externally.

Figure 2:
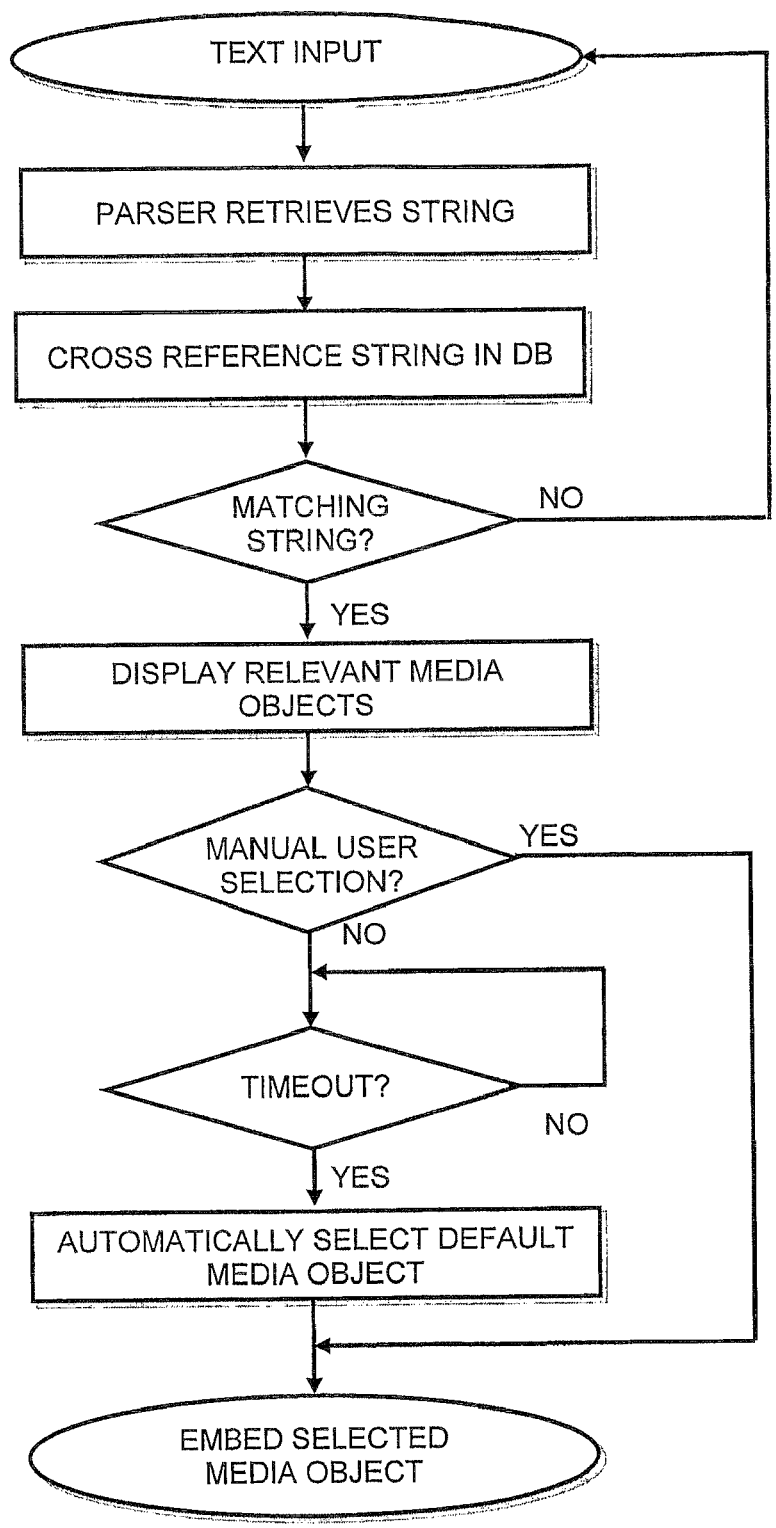
FIG. 2 is a flow diagram showing the principal operations carried out by the system of FIG. 1 in accordance with a non-limiting embodiment.

Having described the basic hardware, the manner of its operation will now be described with reference to FIG. 2. A user inputs a multimedia message using the communication software in known manner. The multimedia message typically includes text, but may also include other symbols such as the so-called "smiley" ☺, copyright © and all other graphic symbols that typically form part of a message. As the message is entered, message data representative of the message is stored in the memory 14 and the parser 15 parses the message data on the fly for identifying successive character strings that may be whole words or symbols or abbreviations or any string that may find a match in the database 16. The comparator 17 compares each of the character strings with data strings in the database and on finding a match according to the predetermined rank, one or more media objects 19a, 19b, 19c, 19d associated with the matching data string are presented on a display device 11. The user manually selects a desired one of the displayed media objects 19a, 19b, 19c, 19d for embedding in spatial association with the associated data string.

Figure 3:
FIG. 3 is a table showing a database structure according to an embodiment of the invention for use with the system of FIG. 1.
Figure 3:
Figure 3:
Figure 3:
Figure 3:
Figure 3:

FIG. 3 is a table showing a database structure according to an embodiment of the invention. Each media object has an ID and a Type. For example, graphic symbols are Type A, animations are Type B, sounds are Type C and pictures are Type D. Combined multimedia content such as audio-visual objects may also provided for, as indeed may any other multimedia object, each having a predetermined type that is indexed in the database. In the illustrative data structure shown in the figure, each media object is mapped to a list of character strings with which the corresponding media object is associated in accordance with a predetermined rank. Typically, the association is conceptual such that the stored media objects are indicative of at least one property associated with a character string in a multimedia message, such as an emotion or any other characteristic associated with the character string. For example the "smiley" ☺ is a graphic symbol of Type A and is mapped to the words "smile", "happy", "great", "fun" and "joy" in this rank. Obviously, if the parser is adapted to break down the media message into whole words and non-alphabetic symbols, the words "smiles" would not map directly to the "smiley". In this case, partial matching within a predetermined significance level would still allow the word "smiles" to be mapped to the "smiley" since the word "smile" is a significant component of "smiles". Partial matching thus avoids the need to map each media object to many almost conceptually identical data strings. Other properties associated with character strings may include objects, events, greetings, gestures etc. For example, 'wave', 'beckon' 'nod', 'shrug', 'gesture' and 'gesticulate' are all words that share the common property of 'gesture' and which can therefore share a common media object.

The significance of the rank will now be described. If the character string is "smile" (or an extension thereof as explained above), the "smiley" has a rank of 1 meaning that by default this symbol will be selected. On the other hand, the rank of the "smiley" is 2 for the word "happy", 3 for the word "great" and so on. The Type B animation object having ID=0002 has no ranking at all for the word "smile" but has rank 1 for the word "cute", 2 for "cuddly", 3 for "sweet", 4 for "bear" and 5 for "happy". The Type C sound object having ID=0003 also has no ranking for the word "smile" but has rank 1 for the word "funny", 2 for "hilarious", 3 for "LOL", 4 for "laughing" and 5 for "LMAO". The Type D picture of the Mona Lisa having ID=0004 has rank 1 for the word "woman", 2 for "painting", 3 for "art", 4 for "beauty" and 5 for "Mona Lisa".

It is thus seen from FIG. 3 that the word "happy" has a rank 1 mapping to the "smiley" having an ID of 0001 and has a rank 5 mapping to the "bear" having an ID of 0002. Consequently, if the parser 15 identifies a character string that maps the word "happy", the "smiley" will be given preference to the "bear" but both will be presented for display: the default in this case being assumed to be the "smiley" since there is no other media object of higher rank mapped to the word "happy". It will be understood that by "mapping" is inferred also partial mapping: so, for example, character strings such as "happiness", "happily", "happier" and "happiest" may also be mapped to the same media objects.

The database 16 whose structure is represented by FIG. 3 may be compiled and maintained in various ways including manual input of media objects and associated keywords or other character strings by an operator. Likewise, the database 16 may be updated dynamically by authorized users for collective indexing (tagging) of content. If desired, end users may access the database 16 over the Internet so as to allow remote compilation and maintenance. Similarly, the database 16 need not be local to a specific application but may be located remote from end-user terminals, which may access the database 16 remotely to extract matching media objects that are then downloaded by an end-user terminal for display locally by the display device 11.

The various media objects may be presented to the user in the form of a dynamic toolbar that automatically updates in real time in response to each newly parsed character string having an entry in the database. Toolbars are a well-known feature of graphical user interfaces in software applications and are used to display features that may be selected by a user simply by clicking on an item in the toolbar. Dynamic toolbars are as well-known in the art reflect an instantaneous state of a software application. An example of such a dynamic toolbar is described in US 2002/0149623A1 (West et al.) published Oct. 17, 2002 and entitled "State and data driven dynamic menu and toolbar architecture". Search engines, directories and toolbars delivering targeted search results are also known. For example, US 2001/0029527A1 (Goshen) published Oct. 11, 2001 and entitled "Method and system for providing a customized browser network" discloses a method including identifying a Uniform Resource Locator (URL) associated with at least one content provider and a browser, and customizing the browser by modifying at least one portion of the browser based upon the URL. The whole contents of both of these references are incorporated herein by reference.

Thus the identified media objects are added to the dynamic toolbar in order of rank for selection by the user. This may be done using the mouse or any other suitable interface such as a light pen or custom key sequence, such as ALT-Tab, or by means of a vocal command. According to some embodiments, the media object having highest rank (constituting the default media object), which is typically the first media object in the toolbar, is highlighted and selected automatically unless the user selects a different media object within a predetermined time, such as 2 seconds. In such way, the user is afforded a measure of control over the selected media object while nevertheless avoiding the need for user interaction where the default media object is acceptable. If a character string matches more than one media object of the same type and the same rank, the default media object may be randomly selected. Once a default media object is randomly selected, it may be forced to have a lower rank for subsequent matches.

According to some embodiments, a record is maintained of the number of selections of each media object, and different default media objects are presented in respect of the same data string if the number exceeds a predetermined threshold. By such means, a multimedia message having multiple repetitions of a character string may automatically embed different media objects at different locations, thereby making the message less tedious. If desired, the different media objects may also be of different types. For example, matching media objects of different types may be selected as the default media object during each successive data entry of matching character strings.

Likewise, the number of selections of each media object may be used to change the rank and update the database in real time. Thus, in the above example, if the user enters a character string that matches "happy" and selects the media animation object having an ID=0002 even though its rank is 5, this may be used to give a higher rank to the animation object having an ID=0002 so that also for subsequent matches of the same or similar character string, the animation object having an ID=0002 will be given priority over other matching media objects. The same technique may also be applied more generally, whereby if a user displays a general preference for sound objects as evidenced by repeated manual selection of sound objects, then sound objects may be given the highest rank of all matching media objects in respect of subsequent matches.

Figure 4:
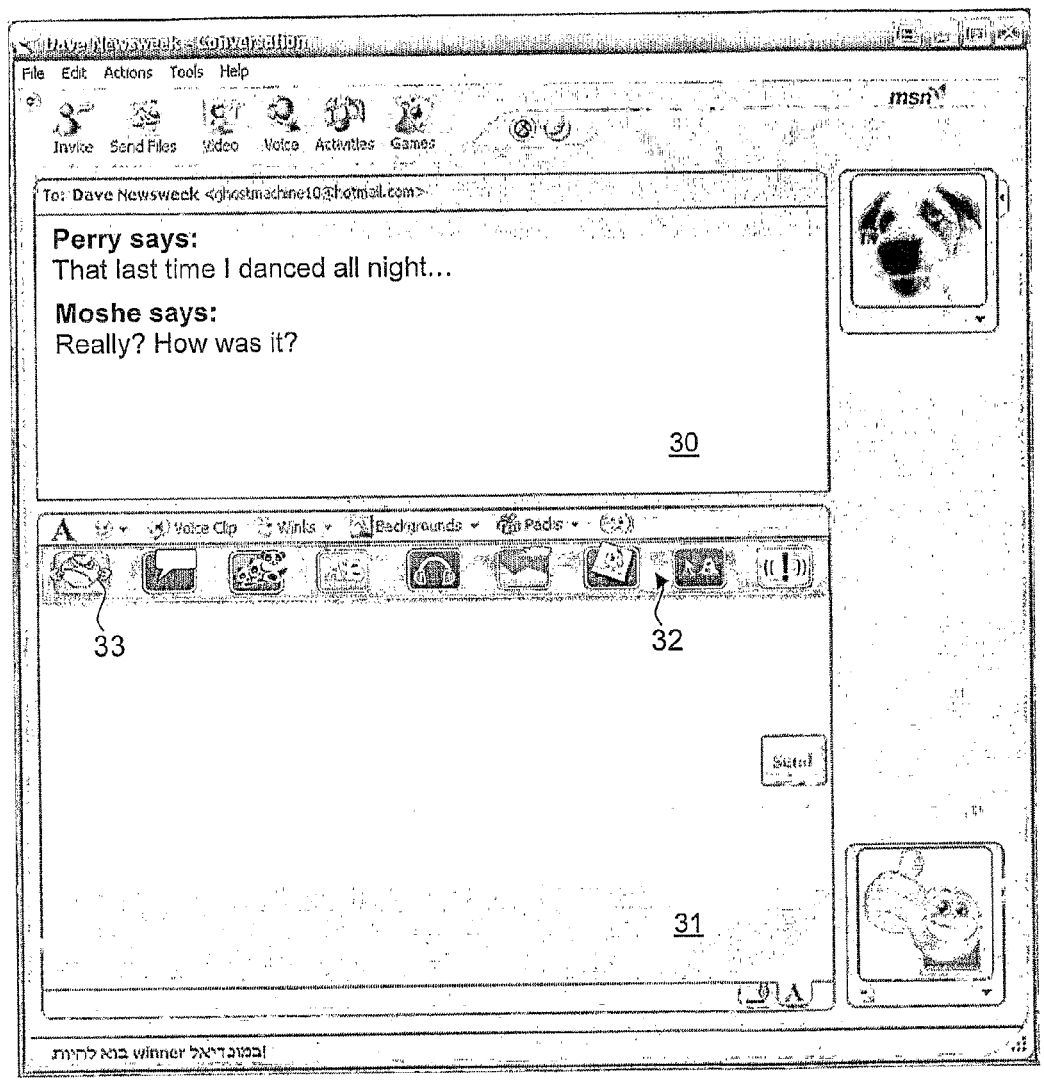
FIGS. 4 to 10 are pictorial representations of screen dumps in an interactive on-line instant messaging application during successive stages of data entry.

FIGS. 4 to 10 are pictorial representations of screen dumps in an interactive on-line instant messaging application during successive stages of data entry according to an embodiment of the invention. FIG. 4 depicts an initial screen during a chat session between two on-line users, Perry and Moshe. The screen is divided into two sections, namely an upper dialog window 30 that displays messages that have already been sent and a lower editor window 31 that displays messages during compilation prior to their being sent. The invention is principally concerned with the on-line editing of multi-media messages during their compilation in the editor window 31, corresponding to the window 12 shown in FIG. 1. Within the editor window 31 there is displayed a toolbar 32 containing multiple media objects of different media types corresponding to the objects 19a, 19b etc. shown in FIG. 1 and arranged in order of rank such that the media object shown as 33 displayed to the left of the toolbar 32 has the highest rank and serves as the default object that is automatically selected if manual selection of a different displayed object is not performed within a timeout period, which may be adjustable if desired.

Figure 5:
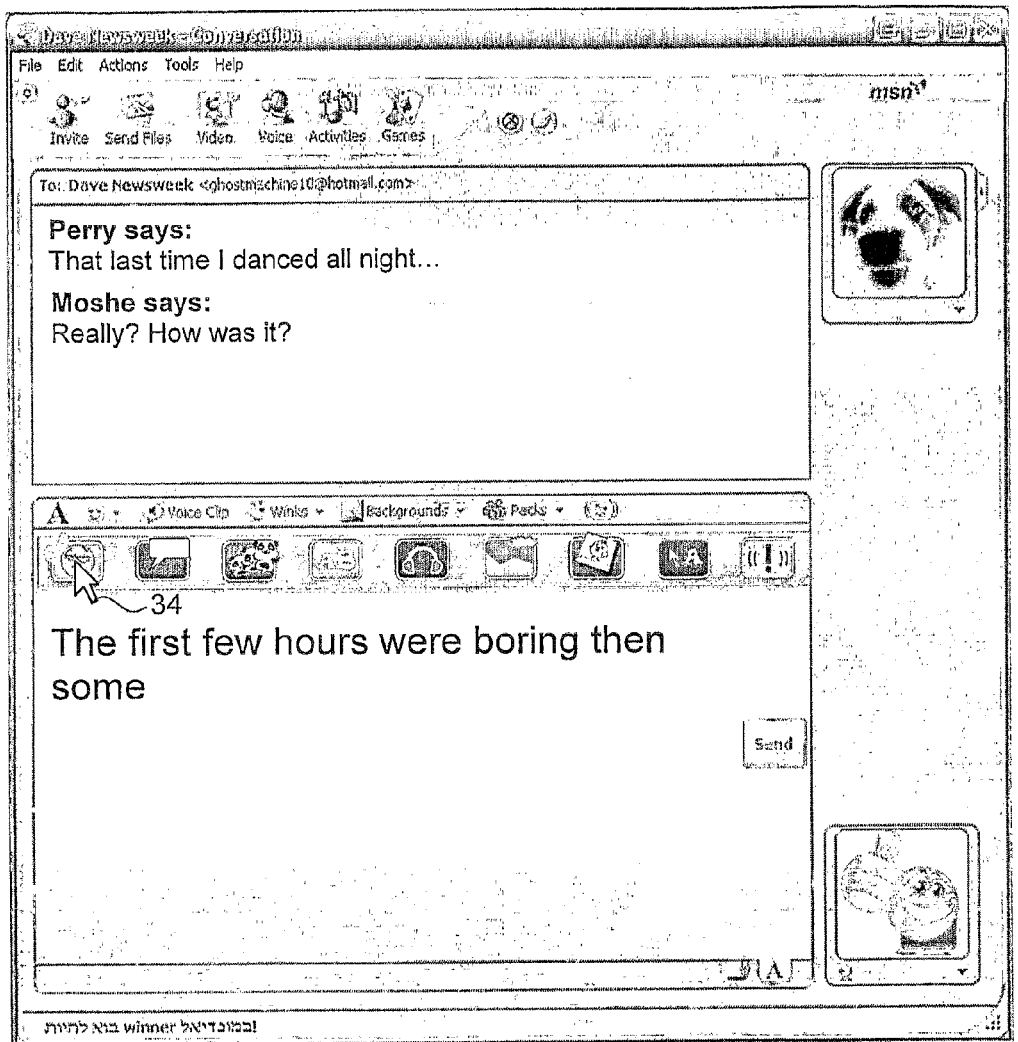

FIG. 5 shows partial entry of message data entered by Perry in response to Moshe's questions: "Really? How was it?" Thus, Perry starts to type in the editor window 31 "The first few hours were boring . . . ." Each word is identified by the parser 15 and compared with data strings in the database 16. When the word "boring" is typed and parsed it is matched to the entry in the database corresponding to ID=0005 having Type B and a rank of 1 for this word. This media object is therefore selected as the default media object and the toolbar 32 is dynamically updated to display this in the leftmost position of the toolbar as shown in FIG. 5, it being seen that the default media objects in FIG. 5 is different from that shown initially in FIG. 4. During the brief time that it takes for the parser 15 and the comparator 17 to identify and match character strings and for the interactive menu compiler 18 to dynamically update the toolbar 32, the user may continue to type and any subsequent text is buffered and displayed as shown in FIG. 5.

Figure 6:
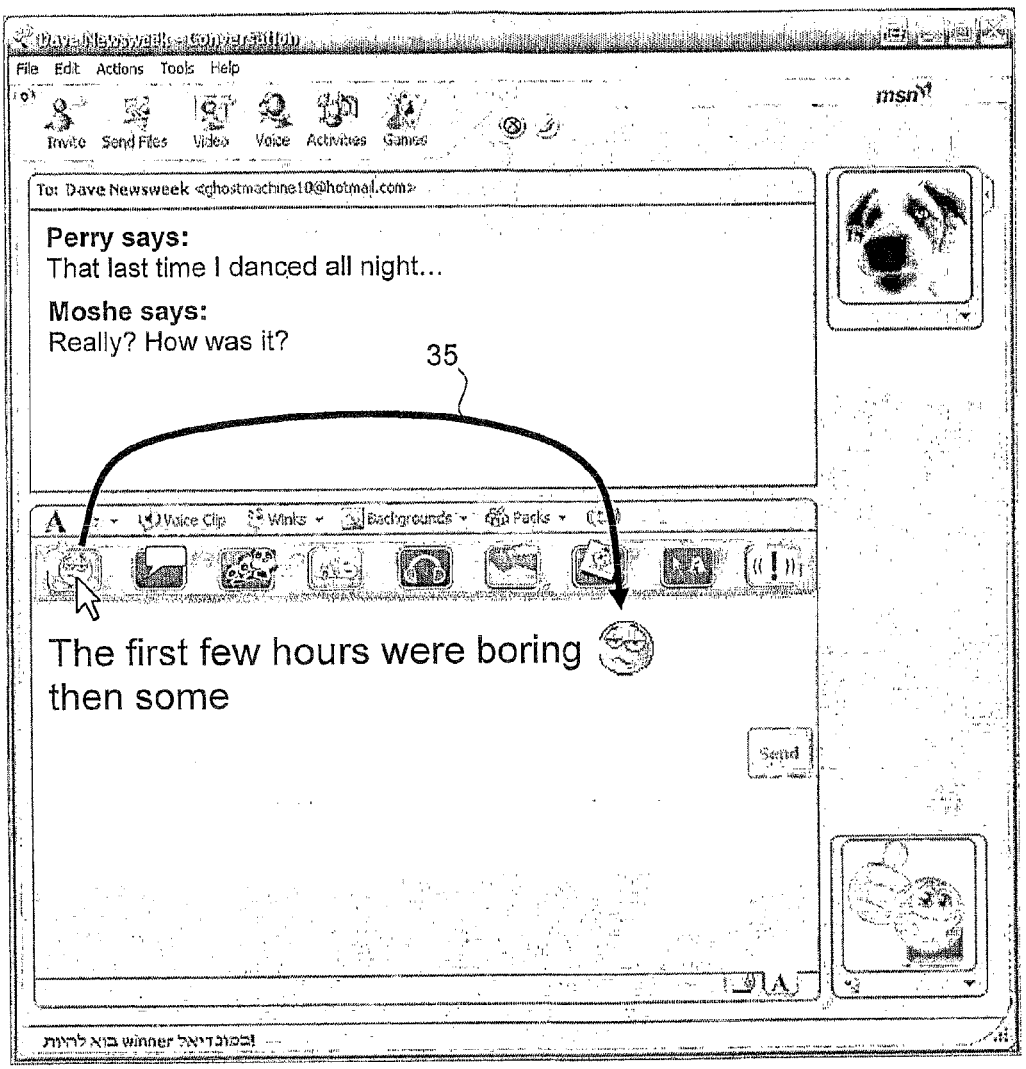

FIG. 6 shows the next stage where the default media object 33 is selected. In the case where the default media object is required, this may be done by the user manually selecting the media object 33 using the mouse as shown by the mouse pointer shown as 34. Alternatively, the user may take no action within the timeout period, in which case the default object 33 will still be selected. More generally, where the user may wish to select a media object other than the default object, he or she must select the required media object manually within the timeout period. FIG. 6 shows schematically via the arrow 35 that the selected media object 33 is now embedded within the message proximate the matched word "boring" i.e. in spatial association with the associated character string. After the media object 33 is embedded, any buffered text is wrapped within the editor window 31.

Figure 7:
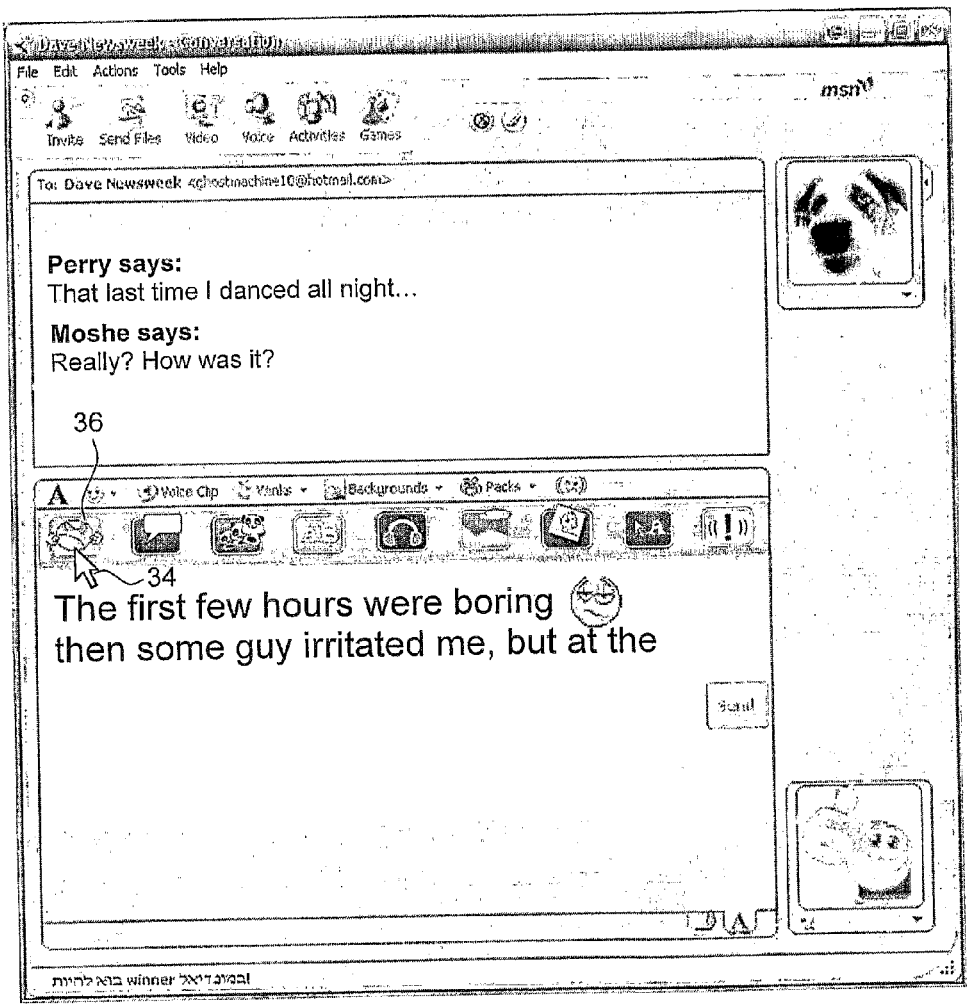

FIG. 7 shows a subsequent stage where the user has added "the some guy irritated . . . " and the word "irritated" is matched to a series of media objects in the database. At this point, the toolbar 32 is dynamically updated to display the matched media objects and the mouse pointer 34 points to a new default media object 36.

Figure 8:
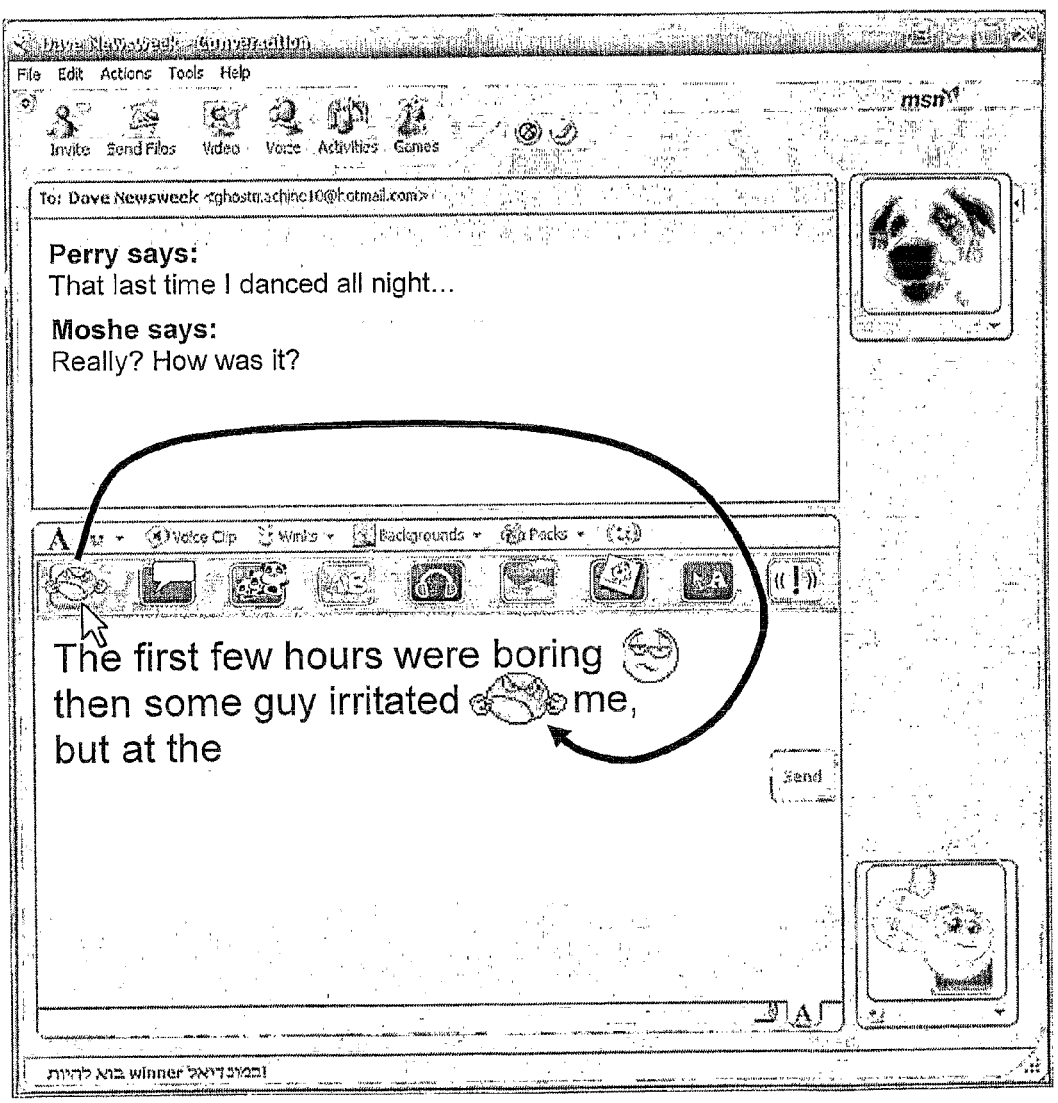

FIG. 8 shows selection of the default media object 36 and its embedding within the message proximate the matched word "irritated" and the wrapping of subsequently entered buffered text.

Figure 9:
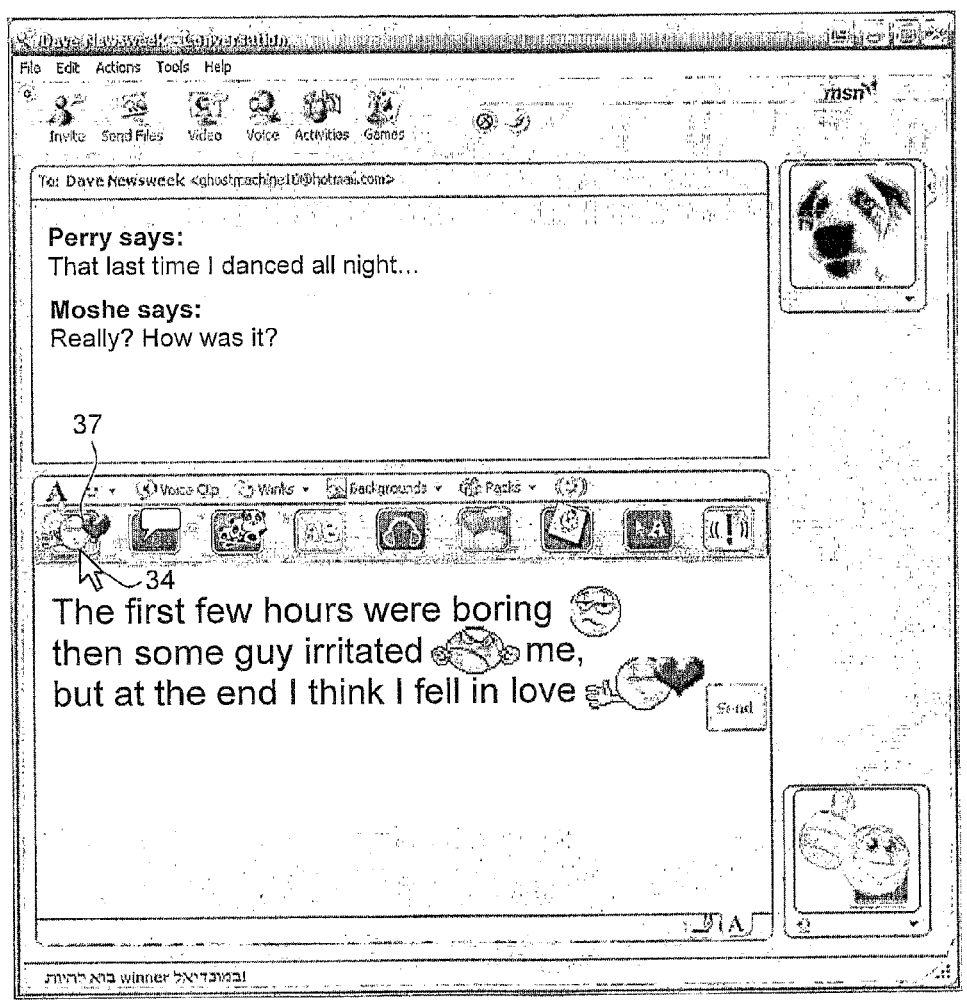

FIG. 9 shows a subsequent stage where the user has added "but at the end I think I fell in love" and the word "love" is matched to a series of media objects in the database. At this point, the toolbar 32 is dynamically updated to display the matched media objects and the mouse pointer 34 points to a new default media object 37, which is embedded within the message after the matched word "love".

Figure 10:
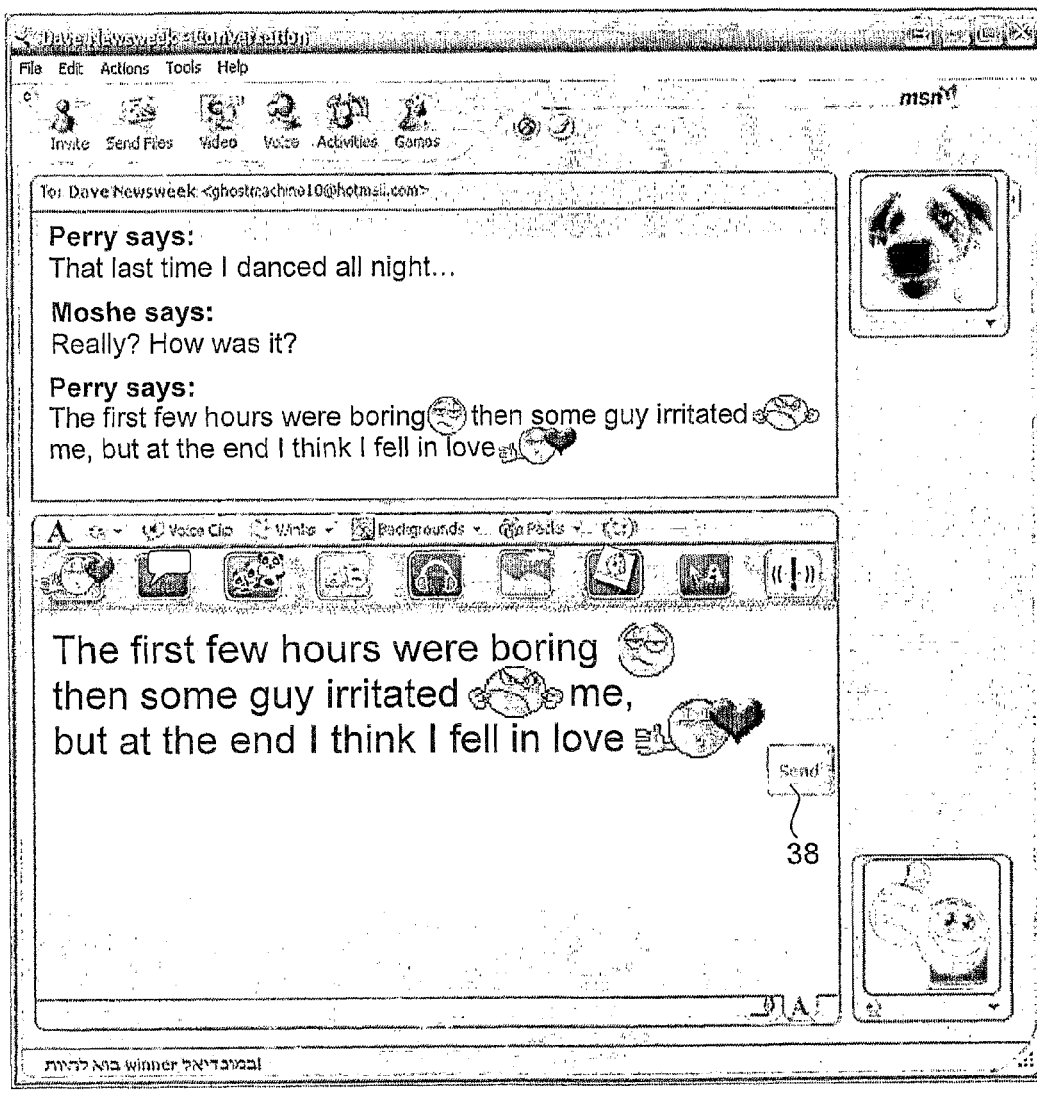

FIG. 10 shows a final stage where Perry's message is complete and he now clicks on the send button 38. The enhanced message containing Perry's text and the selected media objects in proper spatial association with the associated character strings thereof is now transmitted to Moshe, as shown in the dialog window 30.

It will be appreciated that modifications will be apparent to those skilled in the art without departing from the scope of the invention as defined in the appended claims. For example, while in the described embodiments media objects are embedded directly after the character strings with which they are associated, they could equally well be placed directly before the matched character strings or in any other suitable relative spatial disposition.

In the various embodiments described, the data strings are associated with the media objects according to a predetermined rank and are presented to the user in rank order. However, it will be understood that the principles of the invention are also applicable to unranked association between data strings and media objects.

Likewise, although parsing has been described with regard to whole words and parts thereof, it is to be understood that character strings may also be conjugated terms. For example, although the word "happy" and derivatives thereof may be mapped to a specific data string in the database, the conjugate "happy birthday" may be mapped to different data strings or may share some of the same mappings but with a different rank.

Also, while the user interface has been described with particular reference to a keyboard and a mouse it will be understood that the invention may also be used with other interfaces, including vocally dictating a message and/or vocalizing a menu of media objects for insertion into the message in order of rank and allowing manual selection of a desired media object by any suitable means, including vocal selection.

It will also be appreciated that while media objects may be presented to the user in other forms than a dynamic toolbar as described. For example, they may be displayed anywhere on the screen such as alongside or in any other spatial relationship to the character currently being entered. For example, with further reference to FIG. 4, when the word "boring" is typed and mapped to related media objects, the associated media objects may be displayed adjacent to the caret denoting the spatial location on the screen of the next character.

It should also be noted that in accordance with further embodiments of the invention, a string that is mapped to one or more associated media objects may be highlighted until one of the displayed media objects is selected and embedded. This will allow the user to identify to which string the currently displayed media objects relate and avoids possible ambiguity that might be caused by the slight delay between a string being parsed and subsequently mapped to media objects during which time other strings could be entered that could conceivably relate to the same displayed media objects.

It will also be appreciated that the system 10 may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. An interactive message editing system, comprising:
   a database containing data representative of a plurality of media objects and of a plurality of data strings each associated with one or more of said media objects according to a predetermined rank depicting a nominal preference to be accorded to each media object matching the respective data string,
   a memory for storing multimedia message data entered by a user via a user interface,
   a parser coupled to the memory for parsing said message data on the fly for identifying successive character strings,
   a comparator coupled to the parser and to said database for comparing each of the character strings with data strings in the database,
   an interactive menu compiler coupled to the comparator and responsive to a character string at least partially matching a data string in the database for presenting on a display device one or more media objects associated with the data string, and
   a media enhancer responsive to manual selection by the user of a presented media object for embedding the selected media object in spatial association with the associated character string.

2. The system according to claim 1, including a database update unit coupled to the database and responsive to successive manual selections of displayed media objects for adjusting the respective ranks of matching media objects and updating the database accordingly.

3. The system according to claim 2, wherein the database update unit is responsive to repeated manual selection of objects of a specified type, for increasing the rank of all media objects of said specified type in the database.

4. The system according to claim 1, wherein the interactive menu compiler is responsive to a character string matching more than one media object of the same type and the same rank, for selecting one of said default media objects for display.

5. The system according to claim 1, wherein the interactive menu compiler is adapted to present on the display device said one or more media objects associated with the data string according to said predetermined rank.

6. The system according to claim 1, wherein the interactive menu compiler is adapted to select said default media object for display randomly.

7. The system according to claim 1, wherein the interactive menu compiler is responsive to a default media object being selected for display, for forcing said media object to have a lower rank for subsequent matches.

8. An interactive message editing method, comprising:
   maintaining a database containing data representative of a plurality of media objects and of a plurality of data strings each associated with one or more of said media objects;
   storing multimedia message data entered by a user via a user interface;
   parsing said message data on the fly for identifying successive character strings;
   comparing each of the character strings with data strings in the database;
   presenting on a display device one or more media objects associated with a data string in the database that at least partially matches a character string; and
   embedding a selected media object in spatial association with the associated character string;
   wherein, for each of the media objects associated with each data string in said database
   storing a respective rank depicting a nominal preference to be accorded to each media object matching the respective data string; and
   adjusting the respective ranks of matching media objects in response to successive manual selections of displayed media objects and updating the database accordingly.

9. The method according to claim 8, including increasing the rank of all media objects of a specified type in the database in response to repeated manual selection of objects of said specified type.

10. The method according to claim 8, including selecting one of multiple default media objects for display if a character string matches multiple media objects of the same type and the same rank.

11. The method according to claim 10, including randomly selecting said default media object for display.

12. The method according to claim 10, including forcing the default media objects that is selected for display to have a lower rank for subsequent matches.

\* \* \* \* \*